US012059023B2

(12) United States Patent
Loeb et al.

(10) Patent No.: US 12,059,023 B2
(45) Date of Patent: Aug. 13, 2024

(54) METHOD AND APPARATUS FOR INSPECTING AN INDUCTIVELY HEATABLE AEROSOL-GENERATING ARTICLE FOR THE PRESENCE OF A SUSCEPTOR AND A DESIRED ARTICLE ALIGNMENT

(71) Applicant: PHILIP MORRIS PRODUCTS S.A., Neuchatel (CH)

(72) Inventors: Andreas Loeb, Ludwigshafen am Rhein (DE); Luca Bosi, Modigliana (IT); Matteo Grosoli, Modena (IT)

(73) Assignee: Philip Morris Products S.A., Neuchatel (CH)

( * ) Notice: Subject to any disclaimer, the term of this patent is extended or adjusted under 35 U.S.C. 154(b) by 176 days.

(21) Appl. No.: 17/779,654

(22) PCT Filed: Dec. 22, 2020

(86) PCT No.: PCT/EP2020/087562
§ 371 (c)(1),
(2) Date: May 25, 2022

(87) PCT Pub. No.: WO2021/130196
PCT Pub. Date: Jul. 1, 2021

(65) Prior Publication Data

US 2022/0346437 A1 Nov. 3, 2022

(30) Foreign Application Priority Data

Dec. 23, 2019 (EP) .................................... 19219457

(51) Int. Cl.
*A24C 5/34* (2006.01)
*A24C 5/01* (2020.01)
(Continued)

(52) U.S. Cl.
CPC .................. *A24C 5/34* (2013.01); *A24C 5/01* (2020.01); *G01V 3/081* (2013.01); *A24D 1/20* (2020.01);
(Continued)

(58) Field of Classification Search
CPC ........... H05B 6/105; G01N 2021/8816; G01N 21/01; G01N 21/8806; G01N 21/952;
(Continued)

(56) References Cited

U.S. PATENT DOCUMENTS 4,839,602 A 6/1989 Pletcher
5,016,653 A 5/1991 Lassiter
(Continued)

FOREIGN PATENT DOCUMENTS

| | | |
|---|---|---|
| EP | 2568279 | 3/2013 |
| GB | 2204414 | 11/1988 |
| WO | WO 2019/073239 | 4/2019 |

OTHER PUBLICATIONS

PCT Search Report and Written Opinion for PCT/EP2020/087562 dated Mar. 22, 2021 (16 pages).

*Primary Examiner* — Alvaro E Fortich
(74) *Attorney, Agent, or Firm* — Mueting Raasch Group

(57) ABSTRACT

The present invention relates to method for inspecting an inductively heatable aerosol-generating article (1) for the presence of a susceptor (21) using at least one sensor (110) that is responsive to the susceptor (21) being at least one of electrically conductive, magnetic or magnetized. The invention further relates to method and apparatus for inspecting an inductively heatable aerosol-generating article for a desired article alignment at a specific article location in an article manufacturing apparatus, wherein the susceptor is provided for inductively heating an aerosol-forming substrate comprised in the article, and wherein an arrangement of the
(Continued)

Figure 1:
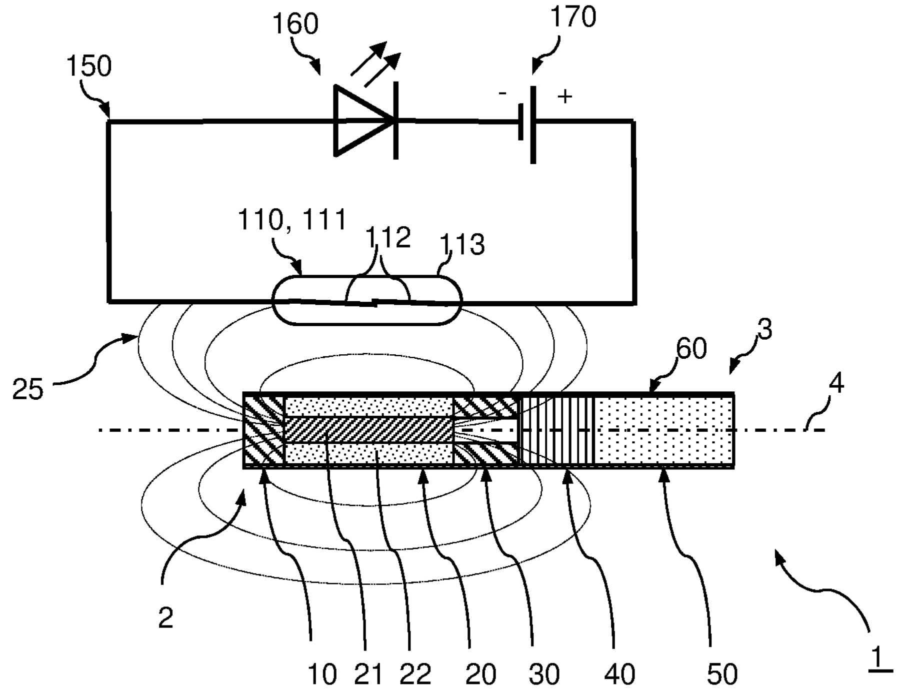

susceptor at or in the article is asymmetric with regard to a length axis of the article. The method and the apparatus comprises usage of at least a first senor which is arranged and configured to detect at a first test site of the article location a presence or absence of a susceptor, wherein the presence of the susceptor at the first test is indicative of the presence of the desired article alignment at the article location. The first sensor is responsive to the susceptor being at least one of electrically conductive, magnetic or magnetized and responsive to the presence of the susceptor at the first test site.

16 Claims, 4 Drawing Sheets

(51) Int. Cl.

| | |
|---|---|
| ***G01V 3/08*** | (2006.01) |
| *A24D 1/20* | (2020.01) |
| *A24F 40/20* | (2020.01) |
| *A24F 40/465* | (2020.01) |
| *G01V 3/10* | (2006.01) |

(52) U.S. Cl.
CPC ............. *A24F 40/20* (2020.01); *A24F 40/465* (2020.01); *G01V 3/088* (2013.01); *G01V 3/10* (2013.01)

(58) Field of Classification Search
CPC ........... A24C 5/34; A24C 5/01; A24C 5/3412; A24C 5/35; G01V 3/081; G01V 3/088; G01V 3/10; A24D 1/20; A24F 40/20; A24F 40/465; A24F 40/70; H01F 7/00
See application file for complete search history.

(56) References Cited

U.S. PATENT DOCUMENTS

| | | | | |
|---|---|---|---|---|
| 6,384,359 | B1 | 5/2002 | Belcastro | |
| 2004/0148908 | A1 | 8/2004 | Focke | |
| 2021/0186108 | A1* | 6/2021 | Korus | A24F 40/465 |
| 2022/0225680 | A1* | 7/2022 | Lopez | A24D 1/20 |
| 2022/0240585 | A1* | 8/2022 | Horrod | H02M 7/4815 |

* cited by examiner

METHOD AND APPARATUS FOR INSPECTING AN INDUCTIVELY HEATABLE AEROSOL-GENERATING ARTICLE FOR THE PRESENCE OF A SUSCEPTOR AND A DESIRED ARTICLE ALIGNMENT

This application is a U.S. National Stage Application of International Application No. PCT/EP2020/087562 filed Dec. 22, 2020, which was published in English on Jul. 1, 2021, as International Publication No. WO 2021/130196 A1. International Application No. PCT/EP2020/087562 claims priority to European Application No. 19219457.9 filed Dec. 23, 2019.

The present disclosure relates to a method for inspecting an inductively heatable aerosol-generating article for the presence of a susceptor. The disclosure further relates to a method and an apparatus for inspecting an inductively heatable aerosol-generating article for the presence of a desired article alignment at a specific article location in an article manufacturing apparatus.

Inductively heatable aerosol-generating articles for generating inhalable aerosols are generally known from prior art. Such articles typically comprise an aerosol-forming substrate and an inductively heatable susceptor that is arranged in thermal proximity of or in direct contact with the substrate. In use, the article is received in a cavity of an aerosol-generating device, where the susceptor is exposed to an alternating magnetic field. Depending on the magnetic and electrical properties of the susceptor, the field induces at least one of eddy currents or hysteresis losses in the susceptor which causes the susceptor to heat up until reaching a temperature which is sufficient to form an aerosol from the substrate.

During the manufacturing of such articles, it may happen that the susceptor gets lost from the article, for example, when being transported through the manufacturing apparatus. Likewise, it may happen that an article is not provided with a susceptor at all. Furthermore, the article may get misaligned during the transport through the manufacturing apparatus. In particular, a longitudinal alignment of the article may be reversed by 180 degrees with regard to a desired article alignment. That is, one end of the article that is supposed to point in a particular direction may erroneously point in the opposite direction.

Accordingly, there is need for a method and an apparatus for inspecting an inductively heatable aerosol-generating article for the presence of a susceptor.

According to an aspect of the present invention, there is provided a method of inspecting an inductively heatable aerosol-generating article for the presence of a susceptor, wherein the susceptor is provided for inductively heating an aerosol-forming substrate comprised in the article. The method comprises the step of detecting the presence or absence of a susceptor using at least one sensor that is responsive to the susceptor being at least one of electrically conductive, magnetic or magnetized.

According to the invention it has been recognized that the presence of a susceptor may be reliably detected by probing the intrinsic electrical and magnetic properties of any susceptor, namely, to be at least one of electrically conductive or magnetic, or—if magnetic and exposed to an external magnetic field—to be magnetized. In particular, probing these properties advantageously allows for inspecting the article for the presence of a susceptor from outside the article even without having the susceptor being visible from outside. This is due to the very nature of the electrical properties (electrically conductive) and the magnetic properties (magnetic or magnetized) of any susceptor to affect the article environment even through the material of the article. To this extent, the method and apparatus according to the present invention are superior to a mere optical inspection which is not always possible because the susceptor may be fully embedded in the article and, thus, is not visible from outside. In addition, it is a further advantage that the intrinsic electrical and magnetic susceptor properties may be remotely probed using a suitable detector that is responsive to at least one of these properties.

As an example, the electric and magnetic properties of the susceptor may cause a detuning of the resonance frequency and the amplitude of an oscillating LC resonator circuit when the susceptor is near the inductor (L) of the LC resonator circuit. Further details of this detection mechanism will be described below.

As another example, the susceptor may be magnetized causing the article to be surrounded by a magnetic field which may be probed by a suitable sensor outside the article, for example, by a reed switch or a Hall-effect sensor or a magnetoresistance-based sensor.

Alternatively, the susceptor may be magnetized and subsequently passed through or nearby an induction loop or an induction coil such that the relative movement between the induction loop or the induction coil and the magnetized susceptor causes a change of the magnetic flux through the induction loop or the induction coil. According to Faraday's law of induction, the change of the magnetic flux induces an electrical current through the induction loop or the induction coil which is indicative for the presence of the magnetized susceptor.

As a result, the method according to the present invention enables to reliably detect missing susceptors and, thus, to sort out defective articles as early as possible before entering a next step of the manufacturing process or before going on sale.

With reference to the examples given above, the at least one sensor may comprise at least one of a reed switch, a Hall-effect sensor, an induction coil, an induction loop, a LC resonator circuit comprising an inductor (L) and a capacitor (C), a giant-magnetoresistance-based sensor, or an anisotropic-magnetoresistance-based sensor. Preferably, the at least one sensor is a non-optical sensor. Accordingly, the method according to the present invention may be denoted as a method of non-optically inspecting an inductively heatable aerosol-generating article for the presence of a susceptor.

A reed switch is an electrical switch operated by an applied magnetic field. The reed switch may comprise a pair of metal contacts at least one of which is magnetizable and flexible. The contacts may be normally open, and closing when a magnetic field is present (as caused by a magnetized susceptor near the reed switch). That is, the end portions metal contacts are separated by a small gap when the switch is open. Alternatively, the contacts may be normally closed and open when a magnetic field is applied. When the magnetic field is removed, the contacts in the reed switch return to their original position. The contacts may be encased in a hermetically sealed envelope.

In a Hall-effect sensor, a thin strip of metal has a current applied along it. In the presence of a magnetic field (as caused by a magnetized susceptor near the Hall-effect sensor), the electrons in the metal strip are deflected toward one edge, producing a voltage gradient across the short side of the strip perpendicular to the feed current. The output voltage is directly proportional to the magnetic field strength through the Hall-effect sensor. The Hall-effect sensor may further comprise a threshold detection circuitry. The threshold detection circuitry may be configured to generate an output signal only when the magnetic field strength and, thus, the output voltage are above a certain threshold. In this configuration, the Hall-effect sensor may act as a switch, sometimes denoted as Hall-effect switch.

As described above, an induction loop or an induction coil may be responsive to a movement of a magnetized susceptor relative to the induction loop or the induction coil when the relative movement causes a change of the magnetic flux through the induction loop or the induction coil. This detection mechanism may be particularly suitable for inspecting an aerosol-generating article for the presence of a susceptor in a passing by.

Advantageously, a LC resonator circuit comprising an inductor (L) and a capacitor (C) is an all-purpose sensor as it responsive to any susceptor type, that is, to a susceptor which is electrically conductive or magnetic or both, electrically conductive and magnetic. For example, when an electrically conductive susceptor is placed in proximity to the inductor of the oscillating LC resonator circuit, the magnetic field generated by the inductor induces eddy currents in the susceptor material. By Lenz's law, the eddy currents create an opposing magnetic field that opposes the change in the magnetic field that created it. Thus, the eddy currents react back on the source of the magnetic field, that is, on the LC resonator circuit, where the net inductive impedance of the LC resonator circuit is lowered accompanied by an increase of the oscillation frequency. Vice versa, in case the susceptor is magnetic (ferromagnetic or ferrimagnetic), that is, in case the susceptor comprises a material having a high magnetic permeability, the presence of the susceptor in proximity to the inductor of the LC resonator circuit causes the inductance of the LC resonator circuit to increase, accompanied by a decrease of the oscillation frequency. A change in the oscillation magnitude may be detected by an amplitude modulation detector. A frequency change may be detected by a frequency discriminator circuit, such as a phase lock loop detector.

Depending on the senor type, in particular its responsivity and its output signal, the step of detecting the presence or absence of a susceptor using the at least one sensor may comprise the step of comparing a signal generated by the sensor with a respective reference signal. The reference signal may be pre-determined such as to be uniquely indicative of the presence of a susceptor. Depending on the sensor type used to detect the susceptor, the reference signal may be a pre-determined reference value, a pre-determined reference range, a pre-determined reference threshold or a pre-determined reference profile each of which is pre-determined such as to be indicative of the presence of a susceptor. For example, in case of a Hall sensor, the reference signal may be a pre-determined reference threshold which an output voltage of the Hall-effect sensor may have to exceed in order to be indicative of the presence of a magnetized susceptor. Vice versa, if an output voltage of the Hall-effect sensor is below the pre-determined reference threshold, it indicates the absence of a susceptor. That is, the absence of a susceptor is detected. Likewise, in case of an LC resonator circuit, the reference signal may be a pre-determined frequency range which the resonance frequency of the LC resonator circuit is shifted into when a susceptor is in proximity to the inductor of the LC resonator circuit. Vice versa, a value of the resonance frequency outside the pre-determined frequency range is indicative of the absence of a susceptor. Preferably, the reference signal is achieved by a pre-calibration of the sensor.

The method may further comprise the step of generating an optical signal when at least one of the presence of a susceptor or the absence of a susceptor is detected. Advantageously, the step of generating an optical signal may allow for an easy implementation of the method into an existing manufacturing apparatus which already comprises an optical inspection system. For example, the existing optical inspection system may have been used so far to inspect aerosol-generating articles for specific manufacturing faults that are detectable by mere optical inspection. Accordingly, one may continue to use the existing optical inspection system without the need for a complete reinstallation of a new inspection system. In particular, one may continue to use an existing interface that operatively couples the optical inspection system with a controller of the manufacturing device. Even more, the controller system itself may be still used without any modification. In particular, any functionality already implemented in the controller system—used so far for evaluating signals received from the optical inspection system—may be still used for evaluating the detection results of the non-optical inspection method according to the present invention. This is because the step of generating an optical signal advantageously provides a transformation of the signals reflecting the detection results of the at least one sensor into optical signals which subsequently may be processed by an existing optical inspection system. To this extent, the method may further comprise the step of detecting the optical signal using one or more optical detectors.

As described before, in case of a magnetic susceptor, the susceptor is capable of being magnetized such that the susceptor and the article are surrounded by a permanent magnetic field which may be used to detect the presence of the susceptor without the susceptor being visible from outside the article. Accordingly, the method may further comprise the step of magnetizing the susceptor prior to detecting the presence or absence of a susceptor using the at least one sensor. The step of magnetizing the susceptor may include using a magnetizer, in particular a permanent magnet or an electro-magnet. Preferably, the magnetizer is arranged at a certain distance from the at least one sensor in order to avoid undesired interference effects between the magnetizer and the sensor.

According to another aspect of the present invention there is provided a method of inspecting an elongate inductively heatable aerosol-generating article for the presence of a desired article alignment at a specific article location in an article manufacturing apparatus. The susceptor is provided for inductively heating an aerosol-forming substrate comprised in the article. An arrangement of the susceptor at or in the article is asymmetric with regard to a length axis of the article. The method comprises the step of detecting at a first test site of the article location a presence or absence of a susceptor using a first sensor. The first sensor is responsive to the susceptor being at least one of electrically conductive, magnetic or magnetized. The first sensor is further responsive to the presence of the susceptor at the first test site, in particular only to the presence of the susceptor at the first test site. The first test site is chosen such the presence of the susceptor at the first test is indicative of the presence of the desired article alignment at the article location. The method further comprises the step of determining the presence of the desired article alignment at the article location in case the presence of a susceptor at the first test site is detected.

According to the invention it has been recognized that the overall general concept of the present invention, that is, using at least one of the intrinsic electrical or magnetic properties of a susceptor for detecting the presence or the absence of a susceptor, may further be used to inspect an aerosol-generating article for the presence of a desired alignment, in particular a desired alignment with regard to a length axis of the article. The possibility to detect a particular article alignment substantially is based on the fact that the susceptor arrangement has an asymmetry along the length axis of the article. This asymmetry inherently allows for distinguishing different article alignments from each other because the position, in particular the distance of the susceptor relative to the first sensor at the first test site, is different for different article alignments. Thus, different article alignments cause different, in particular differentiable responses of the first sensor which are indicative of different article alignments.

As used herein, the first test site refers to a specific site at the article location in the manufacturing apparatus. At the first, a portion of the article is detected for the presence of a susceptor. The same holds for the second test site which will be referred to further below.

In particular, the first sensor may be configured to be exclusively responsive to the presence of the susceptor at the first test site, whereas the susceptor is non-responsive in case the susceptor is at another site at the article location in the manufacturing apparatus. As used herein, the term "non-responsive" means that the first sensor cannot detect the presence of the susceptor at a site other than the first test site. That is, the first sensor detects or indicates the absence of a susceptor at the first test site in case the article alignment is such that the susceptor is present at a site other than the first test site. Accordingly, the first sensor may be configured to have a spatially limited detection range, in particular a spatially limited detecting volume. The detecting range or the detection volume, respectively, may in turn depend on the range and the strength of the effects caused by the specific electrical and magnetic properties of the susceptor. For example, the first sensor may have a spatially limited detecting range of at least 4 centimeters, in particular of at least 2 centimeters, preferably of at least 1 centimeter measured from the first sensor. Likewise, the first sensor may have a spatially limited detecting volume of at least 64 cubic centimeters, in particular of at least 8 cubic centimeters, preferably of at least 1 cubic centimeter.

In general, the first sensor may comprise at least one of a reed switch, a Hall-effect sensor, an induction coil, an induction loop, a LC resonator circuit comprising an inductor and a capacitor, a giant-magnetoresistance-based sensor, or an an isotropic-magnetoresistance-based sensor. Preferably, the first sensor is a non-optical sensor. Further features and advantages of the sensor types have already been described above with regard to the at least one sensor according to the first aspect of the present invention and, thus, equally apply to the first sensor.

Further in accordance with the first aspect of the invention, the step of detecting at the first test site the presence or absence of a susceptor using the first sensor may comprise the step of comparing a first signal generated by the first sensor with a respective first reference signal. Accordingly, the first reference signal may be one of a first reference value, a first reference range, a first reference threshold or a first reference profile, each of which being pre-determined such as to be indicative of the presence of a susceptor at the first test site.

Further features and advantages of the first sensor result from the above description of the at least one sensor according to the first aspect of the present invention and, thus, equally apply to the first sensor.

The specific article location in the article manufacturing apparatus may be one of: a pocket of a conveyor device, a packaging device, or a flute of a conveyor device, or a carrier of a conveyor device. As used herein, a flute may be, for example, a vertical flute of a packing machine, or a flute on the outer circumference of a transport drum, such as on a combiner.

As described before, usage of a first sensor to detect the presence of a susceptor at a first test site allows for positively determining the presence of a desired article alignment when the first test site is chosen such the presence of the susceptor at the first test is indicative of the presence of the desired article alignment at the article location. However, it may happen that the article does not comprise a susceptor at all, for example, because the susceptor has been lost during the transport through the manufacturing apparatus. Hence, it may happen that the article is properly aligned at the article location, but does not comprise a susceptor. This situation cannot be distinguished from a situation, where the article does comprise a susceptor, however, is not aligned at the article location in accordance with the desired article alignment but, for example, in an opposite article alignment having a longitudinal extension reversed by 180 degrees to the desired article alignment. For example, with regard to a flute of a conveyor device, the elongate aerosol-generating article may be received in the flute in two different longitudinal alignments which are reversed to each other by 180 degrees along the length extension of the flute or the article, respectively. In one of the two longitudinal alignments, a specific end of the elongate article may point in a first direction along the length extension of the flute. Vice versa, in the other longitudinal alignment, the specific end of the article points in a second direction opposite to first direction.

In general, only one of the two longitudinal alignments is a desired one, whereas the opposite longitudinal assignment is undesired. For example, when it comes to packaging a group of elongate articles into pack, the article are arranged in a pocket before being inserted into the pack. Generally, it is desired that all articles have the same longitudinal alignment in the pack which requires that the article are already properly aligned in the pocket.

In order to allow for distinguishing a situation, where the article does not comprise a susceptor at all, from a situation, where the article does comprise a susceptor but is aligned in an opposite alignment having a longitudinal extension that is reversed by 180 degrees to the desired article alignment, the method according to the second aspect of the present invention may further comprise the step of detecting at a second test site of the article location a presence or absence of a susceptor using a second sensor. The second sensor is responsive to the susceptor being at least one of electrically conductive, magnetic or magnetized. The second sensor is further responsive to the presence of the susceptor at the second test site, in particular only to the presence of the susceptor at the second test site. The second test site is chosen such the presence of the susceptor at the second test is indicative of the presence of an opposite article alignment at the article location having a longitudinal extension reversed by 180 degrees to the desired article alignment. The method further comprises the step of determining the presence of the opposite article alignment at the article location in case the presence of a susceptor at the second test site is detected, else determining the absence of an article at the article location or the absence of a susceptor at or in the article in case the absence of a susceptor at the first test site and at the second test site is detected.

To this extent, it has been recognized that the presence or absence of the susceptor or the article as well as the presence of one of two article alignments at a specific article location may be uniquely detected by using two sensors, which detect the presence or the absence of the susceptor at two different test sites about the article location.

Preferably, the first test site and, thus, the first sensor is located at about one end or one end portion of the elongate article. The second test site and, thus, the second sensor preferably is located at about the other end or end portion of the elongate article. At these positions, the sensors are most responsive to the asymmetry of the susceptor arrangement with regard to the length axis of the article.

The step of detecting at the first site the presence or absence of a susceptor and the step of detecting at the second site the presence or absence of a susceptor may be performed at the same time. Advantageously, this speeds up the procedure and the final determination of the presence or absence of the susceptor and the presence or absence of the desired article alignment.

Like the first sensor, the second sensor may also comprise one of the sensor types already discussed above. Accordingly, the second sensor may comprise at least one of a reed switch, a Hall-effect sensor, an induction coil, an induction loop, a LC resonator circuit comprising an inductor and a capacitor, a giant-magnetoresistance-based sensor, or an anisotropic-magnetoresistance-based sensor. Like the first sensor, the second sensor may be a non-optical sensor.

Preferably, the first sensor and the second sensor are of the same type. Advantageously, this facilitates the readout and data processing of the sensors and thus the technical effort.

Like the first sensor, the second sensor may be configured to be exclusively responsive to the presence of the susceptor at the second test site.

Furthermore, the second sensor may have a spatially limited detecting range, in particular, spatially limited detecting volume. For example, the second sensor may have a spatially limited detection range of at least 4 centimeters, in particular of at least 2 centimeters, preferably of at least 1 centimeter measured from the first sensor. Likewise, the second sensor may have a spatially limited detection volume of at least 64 cubic centimeters, in particular of at least 8 cubic centimeters, preferably of at least 1 cubic centimeter.

Further in line with the first sensor, the step of detecting at the second test site the presence or absence of a susceptor using the second sensor may comprise the step of comparing a second signal generated by the second sensor with a respective second reference signal. The second reference signal may be one of a second reference value, a second reference range, a second reference threshold or a second profile, each of which being pre-determined such as to be indicative of the presence of a susceptor at the second test site. Alternatively or additionally, the steps of detecting at the first site and at the second test site, respectively, the presence or absence of a susceptor using the first sensor and the second sensor, respectively, may comprise the step of comparing a first signal generated by the first sensor with a second signal generated by the second sensor.

Further features and advantages of the second sensor result from the above description of the at least one sensor and the first sensor according to the invention, thus, equally apply to the second sensor.

As already described above, it might be desirable to upgrade an existing manufacturing apparatus with a non-optical inspection system, for example, when the article design changes such that the susceptor is no longer visible from outside the article. In particular, the upgrade may advantageously involve existing optical inspection systems already implemented in the manufacturing apparatus. Therefore, the method according to the second aspect of the invention may further comprise the step of generating a first optical signal when at least one of the presence of a susceptor at the first test site or the absence of a susceptor at the first test site is detected. Likewise, the method may further comprise the step of generating a second optical signal when at least one of the presence of the susceptor at the second test site or the absence of a susceptor at the second test site is detected. Advantageously, the steps of generating a first optical signal and generating a second optical signal, respectively, provide a transformation of the signals reflecting the detection results of the first sensor and the second sensor into respective optical signals. To readout and further process these optical signals, the method according to the second aspect of the present invention may further comprise the step of detecting the first optical signal and—if realized—detecting the second signal using one or more optical detectors. As described above, the optical detectors preferably are optical detectors already implemented in the manufacturing apparatus.

Depending on the specific sensor type, it might be necessary that the susceptor is magnetized in order to be detectable. Accordingly, the method according to the second aspect of the present invention may further comprise the step of magnetizing the susceptor prior to the step of detecting at the first test site the presence or absence of the susceptor using the first sensor and—if realized—prior to the step of detecting at the second test site the presence or absence of susceptor using the second sensor. The step of magnetizing the susceptor may include using a magnetizer, in particular a permanent magnet or an electro-magnet. Preferably, the magnetizer is arranged at a certain distance to the first senor and—if present—to the second sensors in order to avoid undesired interference effects between the magnetizer and the sensors.

According to yet another aspect of the present invention, there is provided an apparatus for inspecting an elongate inductively heatable aerosol-generating article for the presence of a desired article alignment at a specific article location in an article manufacturing apparatus, wherein the susceptor is provided for inductively heating an aerosol-forming substrate comprised in the article, and wherein an arrangement of the susceptor at or in the article is asymmetric with regard to a length axis of the article. The apparatus comprises a first sensor arranged and configured to detect at a first test site of the article location a presence or absence of a susceptor, wherein the presence of the susceptor at the first test is indicative of the presence of the desired article alignment at the article location. The first sensor is responsive to the susceptor being at least one of electrically conductive, magnetic or magnetized. The first sensor is further responsive to the presence of the susceptor at the first test site, in particular responsive only to the presence of the susceptor at the first test site.

The apparatus allows for positively determine the presence of a desired article alignment at the first test site as described above with regard to the method according to the second aspect of the invention. For this reason, any advantages described above with regard to the method equally apply to the apparatus described herein.

The apparatus may further comprise an electric circuit operatively connected to the first sensor and configured to determine the presence of the desired article alignment at the article location in response to the first sensor detecting the presence of a susceptor at the first test site. The electric circuitry may, for example, provide a signal indicative for the presence of the desired article alignment at the article location.

In order to enable a clear identification as to whether an article is present or comprises a susceptor at all and as to whether the article is aligned in accordance with the desired article alignment, the apparatus may further comprise a second sensor arranged and configured to detect at a second test site of the article location a presence or absence of a susceptor. The presence of the susceptor at the second test is indicative of the presence of an opposite article alignment at the article location having a longitudinal extension that is reversed by 180 degrees to the desired article alignment. The second sensor is responsive to the susceptor being at least one of electrically conductive, magnetic or magnetized. The second sensor is further responsive to the presence of the susceptor at the second test site, in particular responsive only to the presence of the susceptor at the second test site Like the first sensor, the electric circuit may also be operatively connected to the second sensor and configured to determine the presence of the opposite article alignment at the article location in response to the second sensor detecting the presence of a susceptor at the second test site, else to determine the absence of an article at the article location or the absence of a susceptor at or in the article in response to the first sensor and the second sensor detecting the absence of a susceptor at the first test site and the second test site. Alternatively, the apparatus may comprise a separate electric circuit that is operatively connected to the second sensor and configured as described before.

Preferably, the apparatus is configured for carrying out the method according to the present invention.

Accordingly, the first sensor and—if present—the second sensor may correspond to the first sensor and the second sensor described above with regard to the method according to the present invention. Therefore, any features and advantages described before with regard to this method equally apply to the first sensor and the second sensor of the apparatus described herein.

At least one of the first sensor and—if present—the second sensor may comprise one of a reed switch, a Hall-effect sensor, an induction coil, an induction loop, a LC resonator circuit comprising an inductor and a capacitor, a giant-magnetoresistance-based sensor, or an anisotropic-magnetoresistance-based sensor. Preferably, the first sensor and the second sensor are of the same sensor type.

At least one of the first sensor and—if present—the second sensor may be a non-optical sensor.

At least one of the first sensor and—if present—the second sensor may be configured to be exclusively responsive to the presence of the susceptor at the first site and the second test site, respectively.

At least one of the first sensor and—if present—the second sensor may have a spatially limited detecting range, in particular a spatially limited detecting volume.

At least one of the first sensor and—if present—the second sensor may have a spatially limited detection range of at least 4 centimeters, in particular of at least 2 centimeters, preferably of at least 1 centimeter measured from the first sensor.

At least one of the first sensor and—if present—the second sensor may have a spatially limited detection volume of at least 64 cubic centimeters, in particular of at least 8 cubic centimeters, preferably of at least 1 cubic centimeter.

Further in line with the method according to the second aspect of the invention, the apparatus may comprise a magnetizer, in particular a permanent magnet or an electromagnet, arranged and configured to magnetize the susceptor of the article. The magnetizer may be provided in particular in case the first sensor and—if present—the second sensor are configured to be responsive to a magnetic field as described above. Preferably, the magnetizer is arranged at a distance to the first sensor and—if present—to the second sensor in order to avoid undesired interference effects between the magnetizer and the sensors.

The apparatus may further comprise a first optical indicator, in particular a first light-emitting diode, operatively connected to the first sensor or the electric circuit. The first optical indicator may be configured to provide a first optical signal in response to the first sensor detecting the presence of a susceptor at the first test site or in response to the electric circuit determining the presence of the desired article alignment at the article location. Likewise, the apparatus may comprise a second optical indicator, in particular a second light-emitting diode, operatively connected to the second sensor or the electric circuit. The second optical indicator, may be configured to provide a second optical signal in response to the second sensor detecting the presence of a susceptor at the second test site or in response to the electric circuit determining the presence of the opposite article alignment at the article location. As described above, the first optical indicator and the second optical indicator may advantageously be used to transform the signals reflecting the detection results of the first sensor and the second sensor into respective optical signals which in turn may be read out and further processed by an optical inspection system that is already implemented in the apparatus. To this extent, the apparatus may further comprise at least one optical detector, in particular at least one photodiode or at least one camera, arranged and configured to detect at least one of the first optical signal or the second optical signal.

In general, the apparatus may be configured to inspect a single aerosol-generating article. Alternatively or additionally, the apparatus may be configured to inspect a plurality, in particular a group of aerosol-generating articles. Accordingly, the apparatus may comprise a plurality of first sensors, second sensors, electric circuits, first optical indicators and second optical indicators, in particular one of each for each article to be inspected. Preferably, at least two of a first sensor, a second sensor, an electric circuit, a first optical indicator and a second optical indicator may each form an inspection unit for inspecting one of the articles. It is also possible that the apparatus comprises a single sensor, or a single first and a single second sensor to globally inspect a plurality, in particular a group of aerosol-generating articles for the presence or absence of one or more susceptors. In particular, the single sensor, or the single first and the single second sensor may be configured to globally detect the number of susceptors present in the plurality, in particular the group of aerosol-generating articles or, vice versa, the number of susceptors absent in the plurality, in particular the group of aerosol-generating articles, or both the number of susceptors present and the number of susceptors absent in the plurality, in particular the group of aerosol-generating articles.

Further features and advantages of the magnetizer, the first and second optical indicators and the at least one optical detector have already been described above with regard to the methods according to the present invention and equally apply to the apparatus described herein.

As used herein, the term "aerosol-generating article" refers to an article comprising at least one aerosol-forming substrate that, when heated, releases volatile compounds that can form an aerosol. The aerosol-generating article may be denoted a heated aerosol-generating article. That is, the at least one aerosol-forming substrate comprised in the article is intended to be heated rather than combusted in order to release volatile compounds that can form an aerosol. The aerosol-generating article may be a consumable, in particular a consumable for single use. For example, the article may be a cartridge including a liquid aerosol-forming substrate to be heated. Alternatively, the article may be a rod-shaped article, in particular a tobacco article.

According to the present invention, the article further comprises a susceptor positioned in thermal proximity to or thermal contact with the aerosol-forming substrate. In use, the susceptor is inductively heatable by an alternating magnetic field until reaching a temperature that is sufficient to volatilize components of the aerosol-forming substrate which are capable to form an inhalable aerosol. For example, the article may be configured to be received within a cavity of an aerosol-generating device. There, an inductive heating arrangement of the device may generate an alternating magnetic field used to inductively heat the susceptor.

As used herein, the term “susceptor” refers to an element that is capable to convert electromagnetic energy into heat when subjected to an alternating magnetic field. This may be the result of at least one of hysteresis losses and eddy currents induced in the susceptor, depending on the electrical and magnetic properties of the susceptor material. Hysteresis losses occur in ferromagnetic or ferrimagnetic susceptors due to magnetic domains within the material being switched under the influence of an alternating electromagnetic field. Eddy currents may be induced if the susceptor is electrically conductive. In case of an electrically conductive ferromagnetic or ferrimagnetic susceptor, heat can be generated due to both, eddy currents and hysteresis losses. Accordingly, it is intrinsic property of a susceptor to be at least one of electrically conductive or magnetic. Therefore, the susceptor according to the present invention may be at least one of electrically conductive or magnetic. As used herein, the term “magnetic susceptor” refers a susceptor which is either ferromagnetic or ferrimagnetic. It is an intrinsic property of ferromagnetic or ferrimagnetic materials to be magnetizable by an external magnetic field and to be remain magnetized after the external field is removed. Accordingly as used herein, the term “magnetized susceptor” refers to a ferromagnetic or ferrimagnetic susceptor that is magnetized by an external magnetic field and remains magnetized after the external field is removed.

As used herein, the term “aerosol-forming substrate” denotes a substrate formed from or comprising an aerosol-forming material that is capable of releasing volatile compounds upon heating for generating an aerosol. The aerosol-forming substrate is intended to be heated rather than combusted in order to release the aerosol-forming volatile compounds. The aerosol-forming substrate may be a solid aerosol-forming substrate or a liquid aerosol-forming substrate or a gel-like aerosol-forming substrate, or any combination thereof. That is, the aerosol-forming substrate may comprise, for example, both solid and liquid components. The aerosol-forming substrate may comprise a tobacco-containing material containing volatile tobacco flavor compounds, which are released from the substrate upon heating. Alternatively or additionally, the aerosol-forming substrate may comprise a non-tobacco material. The aerosol-forming substrate may further comprise an aerosol former. Examples of suitable aerosol formers are glycerin and propylene glycol. The aerosol-forming substrate may also comprise other additives and ingredients, such as nicotine or flavorings. The aerosol-forming substrate may also be a paste-like material, a sachet of porous material comprising aerosol-forming substrate, or, for example, loose tobacco mixed with a gelling agent or sticky agent, which could include a common aerosol former such as glycerin, and which is compressed or molded into a plug.

Below, there is provided a non-exhaustive list of non-limiting examples. Any one or more of the features of these examples may be combined with any one or more features of another example, embodiment, or aspect described herein.

Example Ex1: Method of inspecting an inductively heatable aerosol-generating article for the presence of a susceptor, the susceptor being provided for inductively heating an aerosol-forming substrate comprised in the article, wherein the method comprises the step of detecting the presence or absence of a susceptor using at least one sensor that is responsive to the susceptor being at least one of electrically conductive, magnetic or magnetized.

Example Ex2: Method according to example Ex1, wherein the at least one sensor comprises at least one of a reed switch, a Hall-effect sensor, an induction coil, an induction loop, a LC resonator circuit comprising an inductor and a capacitor, a giant-magnetoresistance-based sensor, or an anisotropic-magnetoresistance-based sensor.

Example Ex3: Method according to any one of the preceding examples, wherein the at least one sensor is a non-optical sensor.

Example Ex4: Method according to any one of the preceding examples, wherein the step of detecting the presence or absence of a susceptor using the at least one sensor comprises comparing a signal generated by the sensor with a respective reference signal.

Example Ex5: Method according to example Ex4, wherein the reference signal is one of a reference value, a reference range, a reference threshold or a reference profile, each of which being pre-determined such as to be indicative of the presence of a susceptor.

Example Ex6: Method according to anyone of the preceding examples, wherein the method further comprises the step of generating an optical signal when at least one of the presence of a susceptor or the absence of susceptor is detected.

Example Ex7: Method according to example Ex6, wherein the method further comprises the step of detecting the optical signal using one or more optical detectors.

Example Ex8: Method according to anyone of the preceding examples, wherein the method further comprises the step of magnetizing the susceptor prior to detecting the presence of a susceptor using the at least one sensor.

Example Ex9: Method of inspecting an elongate inductively heatable aerosol-generating article for the presence of a desired article alignment at a specific article location in an article manufacturing apparatus, the susceptor being provided for inductively heating an aerosol-forming substrate comprised in the article, wherein an arrangement of the susceptor at or in the article is asymmetric with regard to a length axis of the article, wherein the method comprises the steps of:

- detecting at a first test site of the article location a presence or absence of a susceptor using a first sensor, wherein the first sensor is responsive to the susceptor being at least one of electrically conductive, magnetic or magnetized and responsive to the presence of the susceptor at the first test site, wherein the first test site is chosen such the presence of the susceptor at the first test is indicative of the presence of the desired article alignment at the article location;

determining the presence of the desired article alignment at the article location in case the presence of a susceptor at the first test site is detected.

Example Ex10: Method according to example Ex9, wherein the first sensor is configured to be exclusively responsive to the presence of the susceptor at the first test site.

Example Ex11: Method according to any one of example Ex9 or Ex10, wherein the first sensor has a spatially limited detecting range, in particular a spatially limited detecting volume.

Example Ex12: Method according to example Ex11, wherein the first sensor has a spatially limited detection range of at least 4 centimeters, in particular of at least 2 centimeters, preferably of at least 1 centimeter measured from the first sensor.

Example Ex13: Method according to example Ex11, wherein the first sensor has a spatially limited detection volume of at least 64 cubic centimeters, in particular of at least 8 cubic centimeters, preferably of at least 1 cubic centimeter.

Example Ex14: Method according to any one of examples Ex9 to Ex13, wherein the first sensor comprises at least one of a reed switch, a Hall-effect sensor, an induction coil, an induction loop, a LC resonator circuit comprising an inductor and a capacitor, a giant-magnetoresistance-based sensor, or an anisotropic-magnetoresistance-based sensor.

Example Ex15: Method according to any one of examples Ex9 to Ex14, wherein the first sensor is a non-optical sensor.

Example Ex16: Method according to any one of examples Ex9 to Ex15, wherein the step of detecting at the first test site the presence or absence of a susceptor using the first sensor comprises comparing a first signal generated by the first sensor with a respective first reference signal.

Example Ex17: Method according to any one of examples Ex9 to Ex16, wherein the first reference signal is one of a first reference value, a first reference range, a first reference threshold or a first reference profile, each of which being pre-determined such as to be indicative of the presence of a susceptor at the first test site.

Example Ex18: Method according to any one of examples Ex9 to Ex17, wherein the method comprises the step of:

detecting at a second test site of the article location a presence or absence of a susceptor using a second sensor, wherein the second sensor is responsive to the susceptor being at least one of electrically conductive, magnetic or magnetized and responsive to the presence of the susceptor at the second test site, wherein the second test site is chosen such the presence of the susceptor at the second test is indicative of the presence of an opposite article alignment at the article location having a longitudinal extension reversed by 180 degrees to the desired article alignment; and determining the presence of the opposite article alignment at the article location in case the presence of a susceptor at the second test site is detected, else determining the absence of an article at the article location or the absence of a susceptor at or in the article in case the absence of a susceptor at the first test site and at the second test site is detected.

Example Ex19: Method according to example Ex18, wherein at the article location the first test site, in particular the first test sensor, is located about one end or end portion of the elongate article, and the second test site, in particular, the second sensor, is located about the other end or end portion of the elongate article.

Example Ex20: Method according to anyone of example Ex18 or Ex19, wherein step of detecting at the first site the presence or absence of a susceptor and the step of detecting at the second site the presence or absence of a susceptor are performed at the same time.

Example Ex21: Method according to any one of example Ex18 to Ex20, wherein the second sensor comprises at least one of a reed switch, a Hall-effect sensor, an induction coil, an induction loop, a LC resonator circuit comprising an inductor and a capacitor, a giant-magnetoresistance-based sensor, or an anisotropic-magnetoresistance-based sensor.

Example Ex22: Method according to any one of example Ex18 to Ex21, wherein the second sensor is a non-optical sensor.

Example Ex23: Method according to any one of example Ex18 to Ex22, wherein the first sensor and the second sensor are of the same type.

Example Ex24: Method according to any one of example Ex18 to Ex23, wherein the second sensor is configured to be exclusively responsive to the presence of the susceptor at the second test site.

Example Ex25: Method according to any one of example Ex18 to Ex24, wherein the second sensor has a spatially limited detecting range, in particular a spatially limited detecting volume.

Example Ex26: Method according to example Ex25, wherein the second sensor has a spatially limited detection range of at least 4 centimeters, in particular of at least 2 centimeters, preferably of at least 1 centimeter measured from the first sensor.

Example Ex27: Method according to example Ex25, wherein the second sensor has a spatially limited detection volume of at least 64 cubic centimeters, in particular of at least 8 cubic centimeters, preferably of at least 1 cubic centimeter.

Example Ex28: Method according to any one of example Ex18 to Ex27, wherein the step of detecting at the second test site the presence or absence of a susceptor using the second sensor comprises comparing a second signal generated by the second sensor with a respective second reference signal, and/or wherein the steps of detecting at the first site and at the second test site, respectively, the presence or absence of a susceptor using the first sensor and the second sensor, respectively, may comprise the step of comparing a first signal generated by the first sensor with a second signal generated by the second sensor.

Example Ex29: Method according to example Ex28, wherein the second reference signal is one of a second reference value, a second reference range, a second reference threshold or a second profile, each of which being pre-determined such as to be indicative of the presence of a susceptor at the second test site.

Example Ex30: Method according to any one of example Ex9 to Ex29, wherein the method further comprises the step of generating a first optical signal when at least one of the presence of a susceptor at the first test site or the absence of a susceptor at the first test site is detected.

Example Ex31: Method according to any one of example Ex18 to Ex29, wherein the method further comprises the step of generating a second optical signal when at least one of the presence of the susceptor at the second test site or the absence of a susceptor at the second test site is detected.

Example Ex32: Method according to any one of example Ex30 or Ex31, wherein the method further comprises the step of detecting the first optical signal and—if realized—the second optical using one or more optical detectors.

Example Ex33: Method according to any one half example Ex9 to Ex32, wherein the method further comprises the step of magnetizing the susceptor prior to the step of detecting at the first test site the presence or absence of the susceptor using the first sensor and—if realized—prior to the step of detecting at the second test site the presence or absence of susceptor using the second sensor.

Example Ex34: Method according to any one of the examples Ex9 to Ex33, wherein the specific article location in the article manufacturing apparatus is one of: a pocket of a conveyor device or a packaging device or a flute of a conveyor device or a carrier of a conveyor device.

Example Ex35: Apparatus for inspecting an elongate inductively heatable aerosol-generating article for the presence of a desired article alignment at a specific article location in an article manufacturing apparatus, in particular for carrying out the method according to any one of examples Ex9 to Ex34, the susceptor being provided for inductively heating an aerosol-forming substrate comprised in the article, wherein an arrangement of the susceptor at or in the article is asymmetric with regard to a length axis of the article, the apparatus comprising a first sensor arranged and configured to detect at a first test site of the article location a presence or absence of a susceptor, wherein the presence of the susceptor at the first test is indicative of the presence of the desired article alignment at the article location, wherein the first sensor is responsive to the susceptor being at least one of electrically conductive, magnetic or magnetized and responsive to the presence of the susceptor at the first test site.

Example Ex36: Apparatus according to example Ex35, further comprising a second sensor arranged and configured to detect at a second test site of the article location a presence or absence of a susceptor, wherein the presence of the susceptor at the second test is indicative of the presence of an opposite article alignment at the article location having a longitudinal extension reversed by 180 degrees to the desired article alignment, wherein the second sensor is responsive to the susceptor being at least one of electrically conductive, magnetic or magnetized and responsive to the presence of the susceptor at the second test site.

Example Ex37: Apparatus according to any one of example Ex35 or Ex36, further comprising an electric circuit operatively connected to the first sensor and configured to determine the presence of the desired article alignment at the article location in response to the first sensor detecting the presence of a susceptor at the first test site.

Example Ex38: Apparatus according to example Ex37, wherein the electric circuit is operatively connected to the second sensor and configured to determine the presence of the opposite article alignment at the article location in response to the second sensor detecting the presence of a susceptor at the second test site, else to determine the absence of an article at the article location or the absence of a susceptor at or in the article in response to the first sensor and the second sensor detecting the absence of a susceptor at the first test site and the second test site.

Example Ex39: Apparatus according to anyone of example Ex35 to Ex38, wherein the first sensor is configured to be exclusively responsive to the presence of the susceptor at the first test site.

Example Ex40: Apparatus according to any one of examples Ex34 to Ex39, wherein the first sensor has a spatially limited detecting range, in particular a spatially limited detecting volume.

Example Ex41: Apparatus according to example Ex40, wherein the first sensor has a spatially limited detection range of at least 4 centimeters, in particular of at least 2 centimeters, preferably of at least 1 centimeter measured from the first sensor.

Example Ex42: Apparatus according to example Ex40, wherein the first sensor has a spatially limited detection volume of at least 64 cubic centimeters, in particular of at least 8 cubic centimeters, preferably of at least 1 cubic centimeter.

Example Ex43: Apparatus according to any one of examples Ex35 to Ex42, wherein the first sensor comprises at least one of a reed switch, a Hall-effect sensor, an induction coil, an induction loop, a LC resonator circuit comprising an inductor and a capacitor, a giant-magnetoresistance-based sensor, or an anisotropic-magnetoresistance-based sensor.

Example Ex44: Apparatus according to any one of examples Ex35 to Ex43, wherein the first sensor is a non-optical sensor.

Example Ex45: Apparatus according to anyone of example Ex36 to Ex44, wherein the second sensor is configured to be exclusively responsive to the presence of the susceptor at the second test site.

Example Ex46: Apparatus according to any one of examples Ex36 to Ex45, wherein the second sensor has a spatially limited detecting range, in particular a spatially limited detecting volume.

Example Ex47: Apparatus according to example Ex46, wherein the second sensor has a spatially limited detection range of at least 4 centimeters, in particular of at least 2 centimeters, preferably of at least 1 centimeter measured from the first sensor.

Example Ex48: Apparatus according to example Ex46, wherein the second sensor has a spatially limited detection volume of at least 64 cubic centimeters, in particular of at least 8 cubic centimeters, preferably of at least 1 cubic centimeter.

Example Ex49: Apparatus according to any one of examples Ex36 to Ex48, wherein the second sensor comprises at least one of a reed switch, a Hall-effect sensor, an induction coil, an induction loop, a LC resonator circuit comprising an inductor and a capacitor, a giant-magnetoresistance-based sensor, or an anisotropic-magnetoresistance-based sensor.

Example Ex50: Apparatus according to any one of examples Ex36 to Ex49, wherein the second sensor is a non-optical sensor.

Example Ex51: Apparatus according to any one of examples Ex36 to Ex50, wherein the first sensor and the second sensor are of the same sensor type.

Example Ex52: Apparatus according to any one of examples Ex35 to Ex51, further comprising a magnetizer, in particular a permanent magnet or an electro-magnet, arranged and configured to magnetize the susceptor of the article.

Example Ex53: Apparatus according to any one of examples Ex35 to Ex52, further comprising a first optical indicator, in particular a first light-emitting diode, operatively connected to the first sensor or the electric circuit, and configured to provide a first optical signal in response to the first sensor detecting the presence of a susceptor at the first test site or in response to the electric circuit determining the presence of the desired article alignment at the article location.

Example Ex54: Apparatus according to any one of examples Ex36 to Ex53, further comprising a second optical indicator, in particular a second light-emitting diode, operatively connected to the second sensor or the electric circuit, and configured to provide a second optical signal in response to the second sensor detecting the presence of a susceptor at the second test site or in response to the electric circuit determining the presence of the opposite article alignment at the article location.

Example Ex55: Apparatus according to any one of example Ex53 or Ex54, further comprising at least one optical detector, in particular at least one photodiode or at least one camera, arranged and configured to detect at least one of the first optical signal or the second optical signal.

Figure 2:
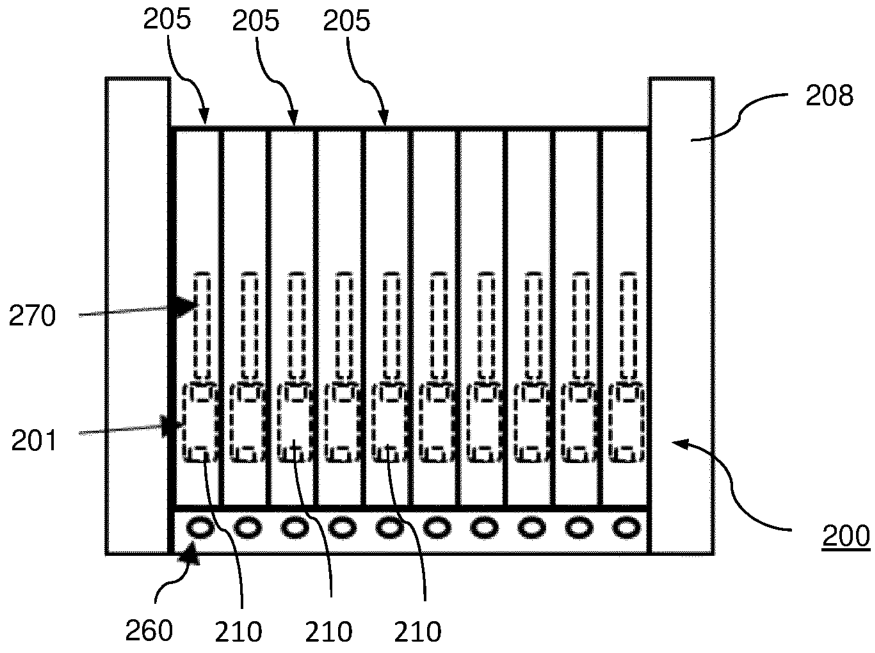
Figure 3:
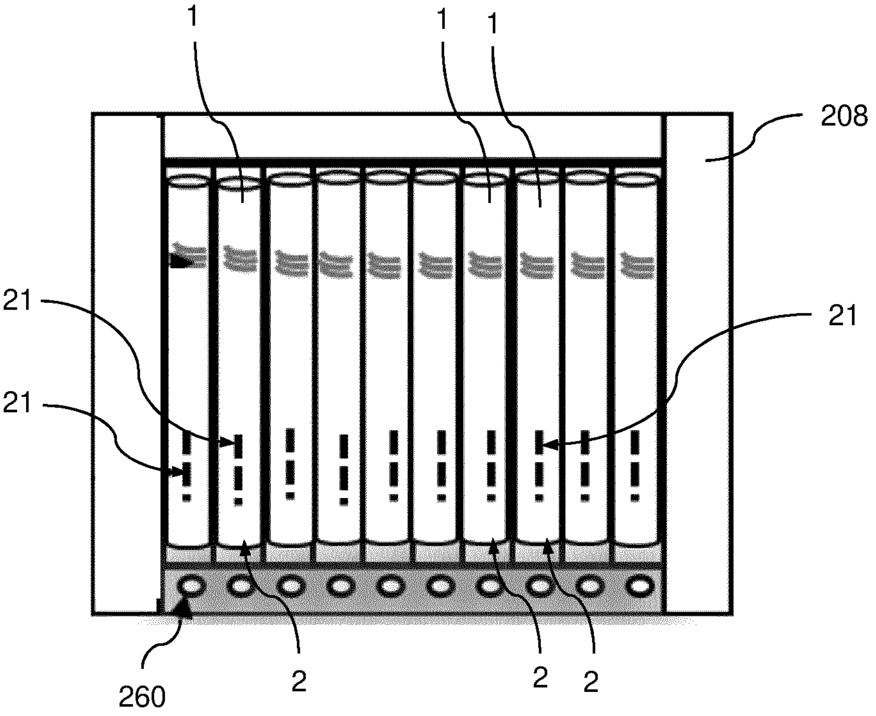
Figure 4:
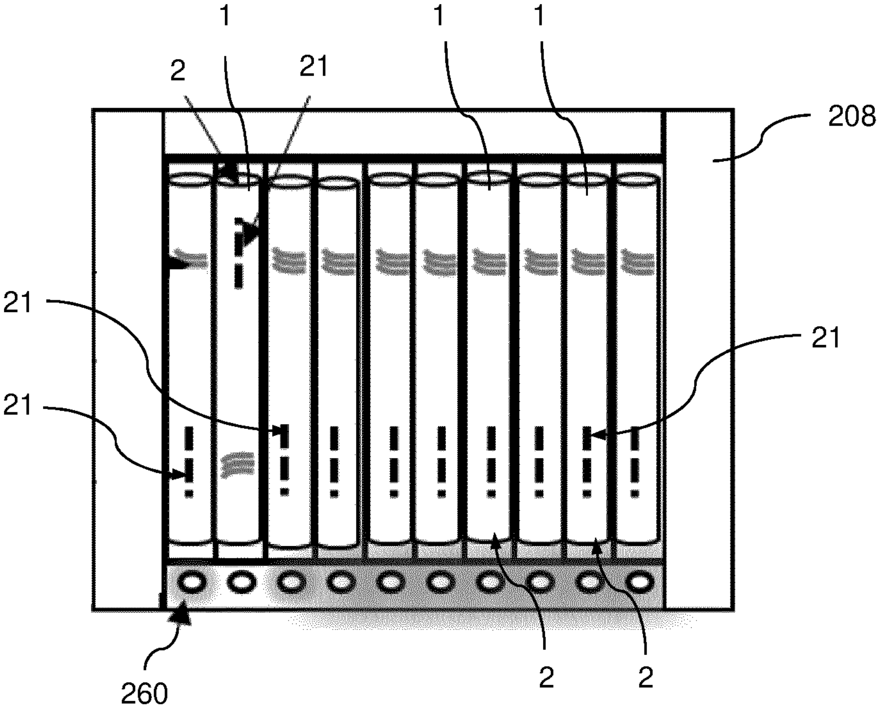

Some examples will now be further described with reference to the figures in which:

FIG. 1 schematically illustrates an exemplary embodiment of the inspection method according to the first aspect of the present invention;

FIGS. 2-4 schematically illustrate a first embodiment of an inspection apparatus according to the third aspect of the present invention; and FIGS. 5-8 schematically illustrate a second embodiment of an inspection apparatus according to the third aspect of the present invention.

FIG. 1 schematically illustrates an exemplary embodiment of the method according to the first aspect of the present invention. This method allows for inspecting an aerosol-generating article 1 for the presence of a susceptor 21. As described further both, such articles 1 are generally known from prior art. Typically, they comprise an aerosol-forming substrate 22 and an inductively heatable susceptor 21 arranged in thermal proximity of or in direct contact with the substrate 22. In use, the article 1 is received in a cavity of an aerosol-generating device (not shown), where the susceptor 21 is exposed to an alternating magnetic field. Depending on the magnetic and electrical properties of the susceptor 21, the field induces at least one of eddy currents or hysteresis losses in the susceptor 21 which causes the susceptor 21 to heat up until reaching a temperature which is sufficient to form an aerosol from the substrate 22.

In the present embodiment, the elongate article 1 is substantially rod-shaped. As can be seen in FIG. 1, the article 1 comprises five elements which are arranged sequentially one after the other in a coaxial alignment along a length axis 4 of the article 1: a first support element 10, a substrate element 20, a second support element 30, an aerosol-cooling element 40 and a mouthpiece element 50. The first support element 10 is arranged at a distal end 2 of the elongate article 1, whereas the mouthpiece element 50 is arranged at a proximal end 3 of the article 1. All five elements 10, 20, 30, 40, 50 are cylindrical elements having substantially the same diameter such as to form a cylindrical rod. The element assembly is circumscribed by an outer wrapper 60 made of cigarette paper, which keeps the elements 10, 20, 30, 40, 50 together. The outer wrapper 60 may be wrapped around the aforementioned elements so that the free ends of the wrapper 60 overlap each other. The wrapper 60 may further comprise adhesive that adheres the overlapped free ends of the wrapper to each other.

The substrate element 20 comprises the aerosol-forming substrate 22 to be heated. For example, the aerosol-forming substrate 22 may comprise a crimped sheet of homogenized tobacco material including glycerin as an aerosol-former. Within the substrate 22, the substrate element further comprises a susceptor 21 in direct contact with the substrate 22. In the present embodiment, the susceptor 21 comprises a metal strip made of ferromagnetic stainless steel which is embedded in the aerosol-forming substrate 22.

Due to the aerosol-forming substrate 22 surrounding the susceptor 21 and due to the first support element 10 and the second support element 30 covering the axial end faces of the cylindrical substrate element 20, the susceptor 21 is not visible from outside the article 1 by mere optical inspection.

According to the present invention, it is suggested to detect the presence or absence of a susceptor 21 in the article 1 using at least one sensor 110 which is responsive to the intrinsic electrical and magnetic properties of the susceptor 21, that is, to the property of the susceptor 21 to be at least one of electrically conductive or magnetic, and—if magnetic and exposed to an external magnetic field—to be magnetized. As stated above, the susceptor 21 of the present embodiment is made of ferromagnetic stainless steel. Accordingly, the susceptor 21 is both, electrically conductive and magnetic. In addition, the susceptor 21 of the present embodiment has been exposed to an external magnetic field prior to the inspection. Hence, as the susceptor material is ferromagnetic, the susceptor 21 is also magnetized and thus surrounded by a static magnetic field as indicated by the dotted magnetic field lines 25 in FIG. 1. In contrast, the aerosol-forming substrate 22 and the other elements of the articles are neither electrically conductive nor highly magnetically permeable. Due to this, the magnetic field lines 25 readily penetrate the other parts of the article 1, and enter the outer periphery of the article 1. Accordingly, the magnetic field may advantageously be used to detect the presence of the susceptor 21 in the article 1 from outside the article 1, even though the susceptor 21 is not visible.

In general, several sensor types are available for probing the presence of magnetic field. In the present embodiment, the sensor 110 comprises a reed switch 111 which is arranged next to the substrate element 20 of the article 1 such as to be penetrated by the magnetic field lines 25 of the magnetized susceptor 21. The reed switch 111 comprises a pair of magnetizable and flexible metal contacts 112 which are encased in a hermetically sealed envelope 113. The contacts 112 are normally open, and closing when a magnetic field is present.

As can be further seen from FIG. 1, the reed switch 111 is operatively connected to an electric circuit 150 comprises a light-emitting diode (LED) 160 and a power supply 170. Accordingly, when the magnetized susceptor 21 is brought in proximity to the reed switch 111, or vice versa, when the reed switch 111 is brought in proximity to the susceptor 21, the reed switch 111 is closed, causing an electric current through the electric circuitry 150 which in turn causes the LED 160 to emit a light signal. In contrast, when a susceptor is missing in the article 1, the reed switch 111 is open and the LED 160 is off, thereby indicating the absence of a susceptor in the article 1.

This general concept of the present invention for detecting the presence of susceptor in an aerosol-generating article may also be used to inspect an article for the presence of presence of a desired article alignment at a specific article location in an article manufacturing apparatus.

As to this, FIG. 2-4 show an article carrier or so-called pocket 208 of a conveyor device which may be used in an article manufacturing apparatus, for example, to pre-arrange a group of aerosol-generating articles 1 prior to being inserted into a pack. Generally, it is desired that all articles 1 have the same longitudinal alignment in the pack. This requires that the articles 1 are already properly aligned in the pocket 208 such that the distal ends 2 of all articles point in the same direction. This situation is shown in FIG. 3. Any article 1 having an opposite article alignment desirably is to be identified prior to inserting the articles 1 into the pack. Such a situation is illustrated in FIG. 4, where one of the articles 1 (second left article) has its distal end 2 pointing into the opposite direction as compared the other articles. That is, the longitudinal extension of this article 1 is reversed by 180 degrees with regard to the other articles 1.

According to the present invention, advantage is taken of the asymmetric arrangement of the susceptor 21 with regard to the length extension of the article 1 in order to inspect the article 1 for the presence of a desired longitudinal article alignment.

As shown in FIG. 2, the pocket 208 is provided with an inspection apparatus 200 which comprises a plurality of first sensors 210 which are configured in the same way as the sensor 110 shown in FIG. 1. That is, the first sensors 210 are responsive to a permanent magnetic field as caused by a magnetized susceptor. In particular, the first sensors 210 may each comprise a reed switch as described above.

Each of the first sensors 210 is associated to a specific location 205 of an article 201 to be received in the pocket 208. In particular, each of the first sensors 210 is arranged at a respective first test site 201 at the associated article location 205. Each first test site 201 is located about the place where the substrate element and the susceptor 21 of the respective article 1 is supposed to be when the article 1 is arranged in accordance with the desired article alignment. Accordingly, in the present embodiment, the first sensors 210 are arranged close to the place where a distal end portion of the respective article 1 is supposed to be.

Accordingly, when an article 1, which comprises a susceptor 21 that has been magnetized before, is arranged in accordance with the desired article alignment, the respective first sensor 210 detects the presence of the susceptor 21 due to presence of the magnetic field in proximity to the respective first sensor 210. In contrast, when the article is in the opposite article alignment (see second left article 1 in FIG. 4), there is no response of the respective first sensor 210 due to the missing magnetic field in proximity to this first sensor 210.

Figure 5:
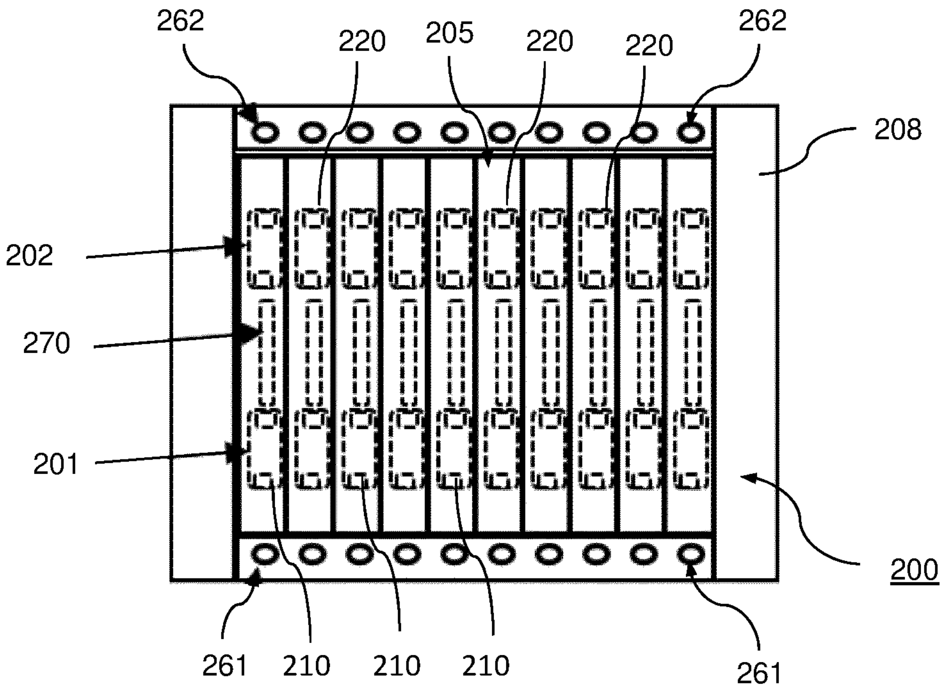
Figure 6:
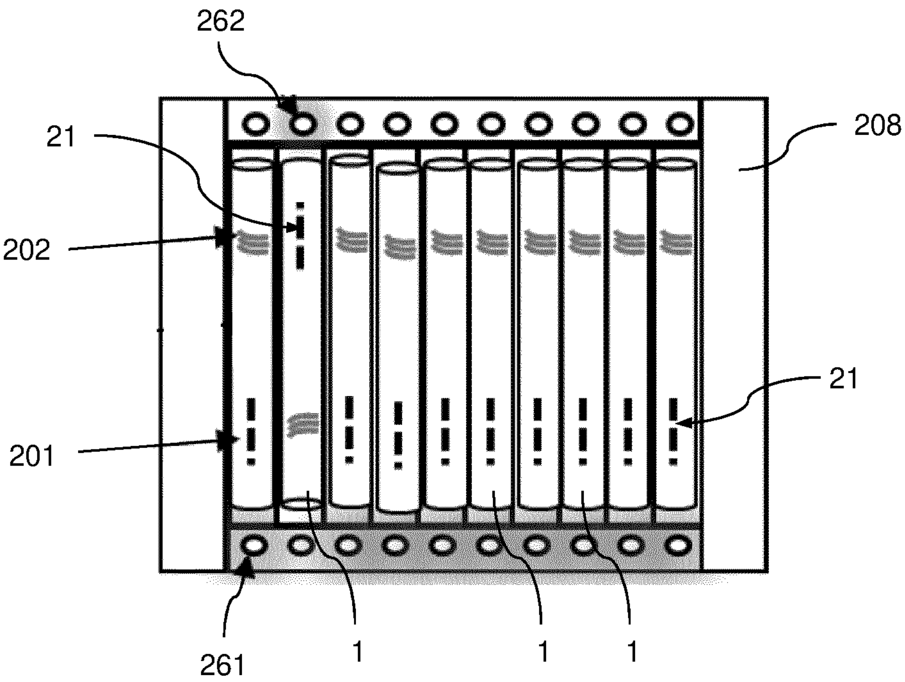

However, when using only one sensor at each article location, this situation may not be distinguishable from a situation where an article 1 does not comprise a susceptor at all or where an article is missing at the respective article location 205. In order to be able to uniquely distinguish between these situations, the inspection apparatus 200 may further comprises a plurality of second sensors 220, as shown in FIG. 5. Each of the second sensors 220, which are arranged at a respective second test site 202 at the associated article location 205 close to the place where the proximal end portion of an article 1 is supposed to be when the article is arranged in the pocket 208 in accordance with the desired article alignment or, vice versa, where the distal end portion of an article 1 is supposed to be when the article 1 is arranged in the pocket 208 in accordance with the opposite article alignment. Hence, when an article 1, which comprises a susceptor 21 that has been magnetized before, is arranged by accident in the opposite article alignment as shown in FIG. 6 (see second left article 1 in FIG. 6), the magnetic field of the magnetized susceptor 21 is close to the associated second test site 202 which causes the second sensor 220 to respond to the magnetic field. Accordingly, the second sensor 220 detects the presence of a susceptor at the second test site 220 which in turn is indicative for the presence of the opposite article alignment.

Figure 7:
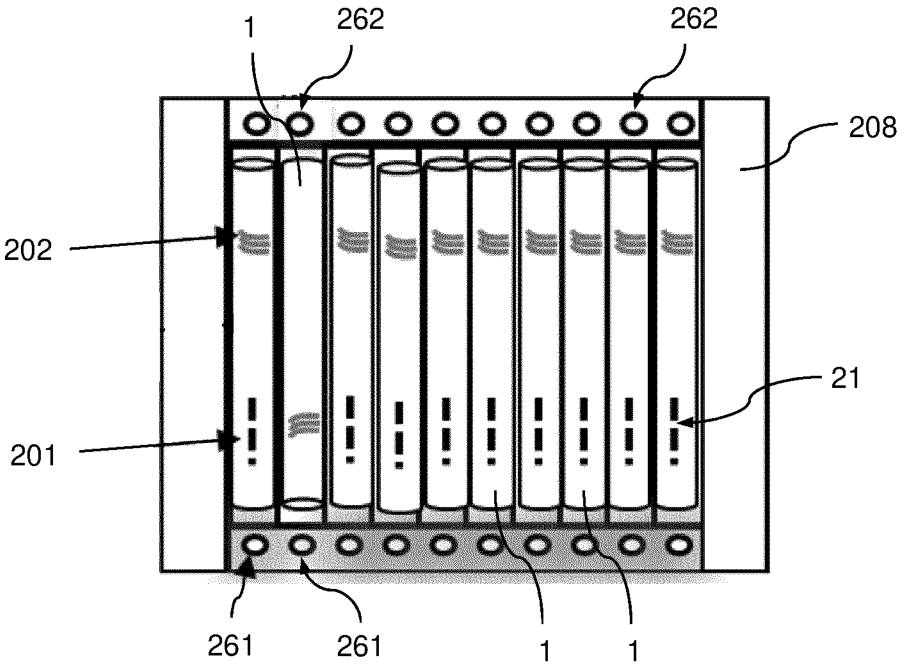
Figure 8:
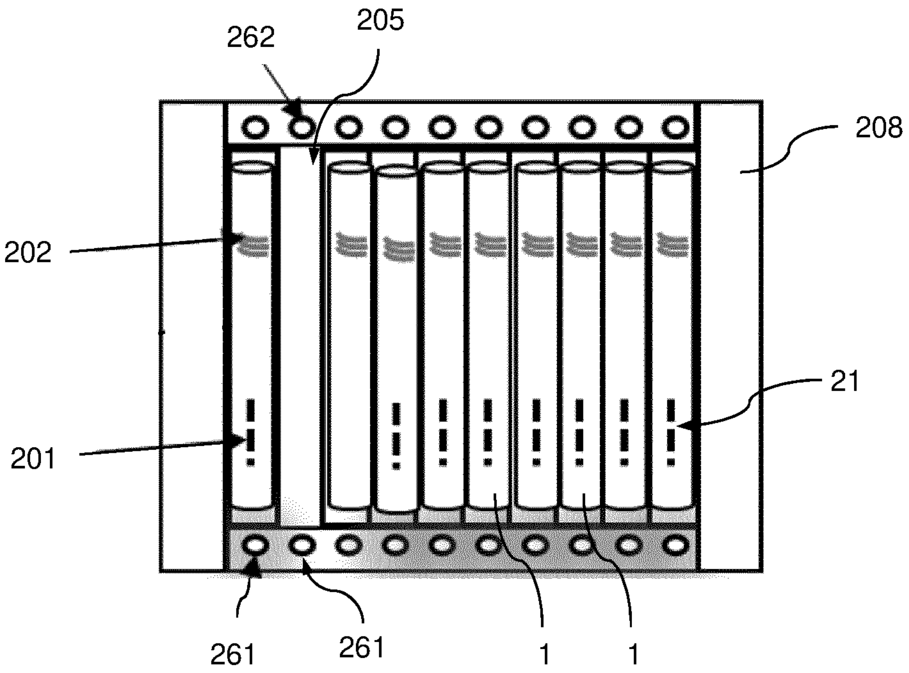

Yet, in case the article does not comprise a susceptor 21, as shown in FIG. 7 (see second left article 1 in FIG. 7), each one of the respective first sensor 210 and the respective second sensor 220 detects the absence of the susceptor at the first test site 201 and the second test site 202, respectively. When taken together, this result indicates the overall absence of a susceptor in the article 1, no matter whether the article 1 is arranged corresponding to the desired article alignment or the opposite article alignment. Likewise, this result may indicate that an article is missing at the respective article location 25 as shown in FIG. 8 (see second left article location 25 in FIG. 8).

Each of the first sensors 210 of the embodiments shown in FIG. 2-4, and each of the first and second sensors 210, 220 of the embodiments shown in FIG. 5-8 is operatively coupled to a respective electric circuit similar to the electric circuit 160 shown in FIG. 1.

With reference to the embodiments shown in FIG. 2-4, each electric circuit may comprise a power supply 270 and a light-emitting diode 260 (as an optical indicator) which generates an optical signal in response to the first sensor 210 detecting the presence of a susceptor 21 at the first test site 201.

Likewise, with reference to the embodiments shown in FIG. 5-8, each electric circuit may comprise a power supply 270 and a first light-emitting diode 261 (as a first optical indicator) which generates a first signal in response to the first sensor 210 detecting the presence of a susceptor 21 at the first test site 201. In addition, each electric circuit may comprise a second light-emitting diode 262 (as a first optical indicator) which generates a second signal in response to a respective second sensor 220 detecting the presence of a susceptor 21 at the respective second test site 202.

The respective electric circuits, in particular the respective power supplies 270, light-emitting diodes 260, 261, 262, and the respective sensors 210, 220 may be integrated into the pocket 208. Even more particular, the respective power supply 270, the respective light-emitting diode(s) 260, 261, 262, and the respective sensor(s) 210, 220 associated to specific article location 25 may form an inspection unit of the inspection apparatus 200. Preferably, each inspection unit is independent from the inspection units of the other article locations within the pocket 20. Preferably, each inspection unit is powered by a single power supply. This applies in particular for the inspection apparatus 200 according to FIG. 5-8, which comprises two sensors 210, 220 and two light emitting diodes 261, 262 for each article location 25. Preferably, the two sensors 210, 220 and the two light emitting diodes 261, 262 are powered together by a common power supply 270 associated to the respective article location 25.

As described above, the light-emitting diodes 260, 261, 262 transform the responses of the respective first and second sensor 210, 220 into first and second optical signals which are indicative of the presence or absence of a susceptor 21 at the first test site 201 and the second test site 202, respectively. Together, each set of a first optical signal and a second optical signal is indicative of the presence or absence of the desired article alignment. That is, when the first light-emitting diode 261 is on and a second light-emitting diode 262 is off, the respective article 1 is aligned in accordance with the desired article alignment (see, for example, FIG. 3 or left article 1 in FIG. 6). Vice versa, when the first light-emitting diode 261 is off and the second light-emitting diode 262 is on, the respective article 1 is aligned in accordance with the opposite article alignment (see second left article 1 in FIG. 6). Finally, when the first light-emitting diode 261 and the second light-emitting diode 262 are both off, the respective article 1 does not comprise a susceptor at all (see second left article 1 in FIG. 7) or the respective article location 25 lacks an article (see second left article location 25 in FIG. 8). Advantageously, the generation of first and second optical signals allows for an easy implementation of the inspection apparatus and method into an existing manufacturing apparatus which already comprises an optical inspection system.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5% of A.

The invention claimed is:

1. Method of inspecting an elongate inductively heatable aerosol-generating article comprising a susceptor for the presence of a desired article alignment at a specific article location in an article manufacturing apparatus, the susceptor being provided for inductively heating an aerosol-forming substrate comprised in the article, wherein an arrangement of the susceptor at or in the article is asymmetric with regard to a length axis of the article, wherein the method comprises the steps of:

detecting at a first test site of the article location a presence or absence of the susceptor using a first sensor, wherein the first sensor is responsive to the susceptor being at least one of electrically conductive, magnetic or magnetized and responsive to the presence of the susceptor at the first test site, wherein the first test site is chosen such the presence of the susceptor at the first test site is indicative of the presence of the desired article alignment at the article location; and determining the presence of the desired article alignment at the article location in case the presence of the susceptor at the first test site is detected.

2. Method according to claim 1, wherein the method comprises the step of:

detecting at a second test site of the article location a presence or absence of the susceptor using a second sensor, wherein the second sensor is responsive to the susceptor being at least one of electrically conductive, magnetic or magnetized and responsive to the presence of the susceptor at the second test site, wherein the second test site is chosen such the presence of the susceptor at the second test is indicative of the presence of an opposite article alignment at the article location having a longitudinal extension reversed by 180 degrees to the desired article alignment; and determining the presence of the opposite article alignment at the article location in case the presence of the susceptor or an additional susceptor at the second test site is detected, else determining the absence of an article at the article location or the absence of the susceptor at or in the article in case the absence of the susceptor at the first test site and at the second test site is detected.

3. Method according to claim 1, further comprising the step of generating a first optical signal when the presence of the desired alignment is determined.

4. Method according to claim 3, further comprising the step of detecting at least one of the first optical signal and a second optical signal using one or more optical detectors.

5. Method according to claim 1, wherein the specific article location in the article manufacturing apparatus is one of: a pocket of a conveyor device or a packaging device, or a flute of a conveyor device, or a carrier of a conveyor device.

6. Method according to claim 2, wherein step of detecting at the first test site the presence or absence of the susceptor and the step of detecting at the second test site the presence or absence of a susceptor are performed at the same time.

7. Method according to claim 2, further comprising the step of magnetizing the susceptor prior to detecting at the first site the presence of the susceptor and—if realized—prior to detecting at the second site the presence of the susceptor.

8. Apparatus configured to perform the method of claim 1, the apparatus comprising:

a first sensor arranged and configured to detect at a first test site of the article location a presence or absence of the susceptor, wherein the presence of the susceptor at the first test site is indicative of the presence of the desired article alignment at the article location, wherein the first sensor is responsive to the susceptor being at least one of electrically conductive, magnetic or magnetized and responsive to the presence of the susceptor at the first test site.

9. Apparatus according to claim 8, further comprising a second sensor arranged and configured to detect at a second test site of the article location a presence or absence of the susceptor, wherein the presence of the susceptor at the second test site is indicative of the presence of an opposite article alignment at the article location having a longitudinal extension reversed by 180 degrees to the desired article alignment, wherein the second sensor is responsive to the susceptor being at least one of electrically conductive, magnetic or magnetized and responsive to the presence of the susceptor at the second test site.

10. Apparatus according to claim 8, further comprising an electric circuit operatively connected to the first sensor and configured to determine the presence of the desired article alignment at the article location in response to the first sensor detecting the presence of the susceptor at the first test site, and wherein the electric circuit preferably is operatively connected to a second sensor and configured to determine the presence of the opposite article alignment at the article location in response to the second sensor detecting the presence of a susceptor at the second test site, else to determine the absence of an article at the article location or the absence of a susceptor at or in the article in response to the first sensor and the second sensor detecting the absence of a susceptor at the first test site and the second test site.

11. Apparatus according to claim 8, wherein at least one of the first sensor or a second sensor comprises one of: a reed switch, a Hall-effect sensor, an induction coil, an induction loop, a LC resonator circuit comprising an inductor and a capacitor, a giant-magnetoresistance-based sensor, or an anisotropic-magnetoresistance-based sensor.

12. Apparatus according to claim 8, further comprising a magnetizer, in particular a permanent magnet or an electromagnet, arranged and configured to magnetize the susceptor of the article.

13. Apparatus according to claim 8, further comprising at least one of a first optical indicator, in particular a first light-emitting diode, operatively connected to the first sensor or an electric circuit, and configured to provide a first optical signal in response to the first sensor detecting the presence of a susceptor at the first test site or in response to the electric circuit determining the presence of the desired article alignment at the article location, and a second optical indicator, in particular a second light-emitting diode, operatively connected to the second sensor or the electric circuit, and configured to provide a second optical signal in response to the second sensor detecting the presence of a susceptor at the second test site or in response to the electric circuit determining the presence of the opposite article alignment at the article location.

14. Apparatus according to claim 13, further comprising at least one optical detector arranged and configured to detect at least one of the first optical signal or the second optical signal.

15. Method according to claim 3, further comprising the step of generating a second optical signal when the presence of the opposite article alignment is determined.

16. Apparatus according to claim 14, wherein the at least one optical detector is at least one of: at least one photodiode and at least one camera.

* * * * *